United States Patent
Patel et al.

(10) Patent No.: US 7,015,667 B2
(45) Date of Patent: Mar. 21, 2006

(54) CURRENT REGULATION FOR A FIELD WEAKENING MOTOR CONTROL SYSTEM AND METHOD

(75) Inventors: Nitinkumar R. Patel, Cypress, CA (US); Steven E. Schulz, Torrance, CA (US)

(73) Assignee: General Motors Corporation, Detroit, MI (US)

( * ) Notice: Subject to any disclaimer, the term of this patent is extended or adjusted under 35 U.S.C. 154(b) by 108 days.

(21) Appl. No.: 10/808,082

(22) Filed: Mar. 24, 2004

(65) Prior Publication Data
US 2005/0212471 A1 Sep. 29, 2005

(51) Int. Cl.
*H02P 7/00* (2006.01)

(52) U.S. Cl. ...................... 318/432; 318/433

(58) Field of Classification Search ............. None
See application file for complete search history.

(56) References Cited

U.S. PATENT DOCUMENTS

| | | | | |
|---|---|---|---|---|
| 5,032,771 | A | * 7/1991 | Kerkman et al. | 318/52 |
| 5,739,664 | A | * 4/1998 | Deng et al. | 318/808 |
| 6,407,531 | B1 | * 6/2002 | Walters et al. | 318/805 |
| 6,741,060 | B1 | * 5/2004 | Krefta et al. | 318/727 |
| 6,924,617 | B1 | * 8/2005 | Schulz et al. | 318/701 |

* cited by examiner

*Primary Examiner*—David Martin
*Assistant Examiner*—Patrick Miller
(74) *Attorney, Agent, or Firm*—Christopher DeVries

(57) ABSTRACT

A control system and method for an electric machine includes a first calculation module that receives a modified torque command and a calculated stator flux command and that generates first and second current commands and first and second voltage commands. A voltage magnitude calculation module generates a voltage magnitude based the first and second voltage commands. A reference voltage calculator module generates a reference voltage based on a DC link voltage, an angular stator velocity and the first and second current commands. A flux weakening module generates the calculated flux command based on the angular stator velocity, the reference voltage and the voltage magnitude.

12 Claims, 4 Drawing Sheets

CURRENT REGULATION FOR A FIELD WEAKENING MOTOR CONTROL SYSTEM AND METHOD

FIELD OF THE INVENTION

The present invention relates to motor control, and more particularly to regulating current in motors during current transients when the motor is controlled using a field weakening control system.

BACKGROUND OF THE INVENTION

A vector controlled PWM voltage source inverter may be used to excite a PM motor, such as an interior permanent magnet (IPM) motor. Using this approach provides accurate torque control, improved dynamic response, and increased motor efficiency. Reducing the magnetic flux inside the motor, which is also called flux or field weakening, may provide improved power characteristics of the PM motor at higher speeds. Flux weakening in a PM motor can be accomplished by adjusting the stator excitation.

During a constant torque region, closed loop current regulators control the applied PWM voltage excitation so that the instantaneous phase currents follow their commanded values. However, saturation of the current regulators may occur at higher speeds when the motor terminal voltage approaches the maximum voltage of the PWM inverter. Beyond this point, the flux should be weakened to maintain proper current regulation up to maximum motor speed.

Conventional field weakening approaches rely on voltage control loops or current angle control loops. Inherently, the voltage control loop approach has poor dynamic performance. Additionally, for IPM machines with reluctance and magnet flux, using the voltage control loop for field weakening does not guarantee optimum torque per ampere in the field-weakening region.

The current angle control loop approach does not work with high back EMF PM machines since it cannot inject any field weakening current when torque is not applied at higher speeds. In addition, for a given constant torque command, the current angle control loop approach will not maintain constant developed torque (i.e. torque linearity) as the drive enters into field weakening and approaches maximum speed.

SUMMARY OF THE INVENTION

A control system according to the present invention for an electric machine includes a first calculation module that receives a modified torque command and a calculated stator flux command and that generates first and second current commands and first and second voltage commands. A voltage magnitude calculation module generates a voltage magnitude based the first and second voltage commands. A reference voltage calculator module generates a reference voltage based on a DC link voltage, an angular stator velocity and the first and second current commands. A flux weakening module generates the calculated flux command based on the angular stator velocity, the reference voltage and the voltage magnitude.

In other features, a torque limiting module generates the modified torque command by limiting an input torque command. The first calculation module includes a current command calculation module that generates the first and second current commands based on the calculated stator flux command and the modified torque command.

In other features, a synchronous current regulator module generates the first and second command voltages based on the first and second command currents. A transformation module generates first and second stationary output voltages from the first and second command voltages. A square of the reference voltage is equal to a square of the voltage magnitude minus a square of a transient stator voltage.

In still other features, the square of the transient stator voltage is equal to a square of first current transient minus a first cross coupling term plus a square of second current transient plus a second cross coupling term.

A method according to the present invention for operating an electric machine includes the step of calculating first and second current commands based on a modified torque command and a calculated stator flux command. First and second voltage commands are generated based on the first and second current commands. A voltage magnitude is calculated based the first and second voltage commands. A reference voltage is generated based on a DC link voltage, an angular stator velocity and the first and second current commands. The calculated flux command is generated based on the angular stator velocity, the reference voltage and the voltage magnitude.

In other features, an input torque command is limited to the modified torque command. The first and second command voltages are transformed into first and second stationary output voltages. A square of the reference voltage is equal to a square of the voltage magnitude minus a square of a transient stator voltage. The square of the transient stator voltage is equal to a square of first current transient minus a first cross coupling term plus a square of second current transient plus a second cross coupling term.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
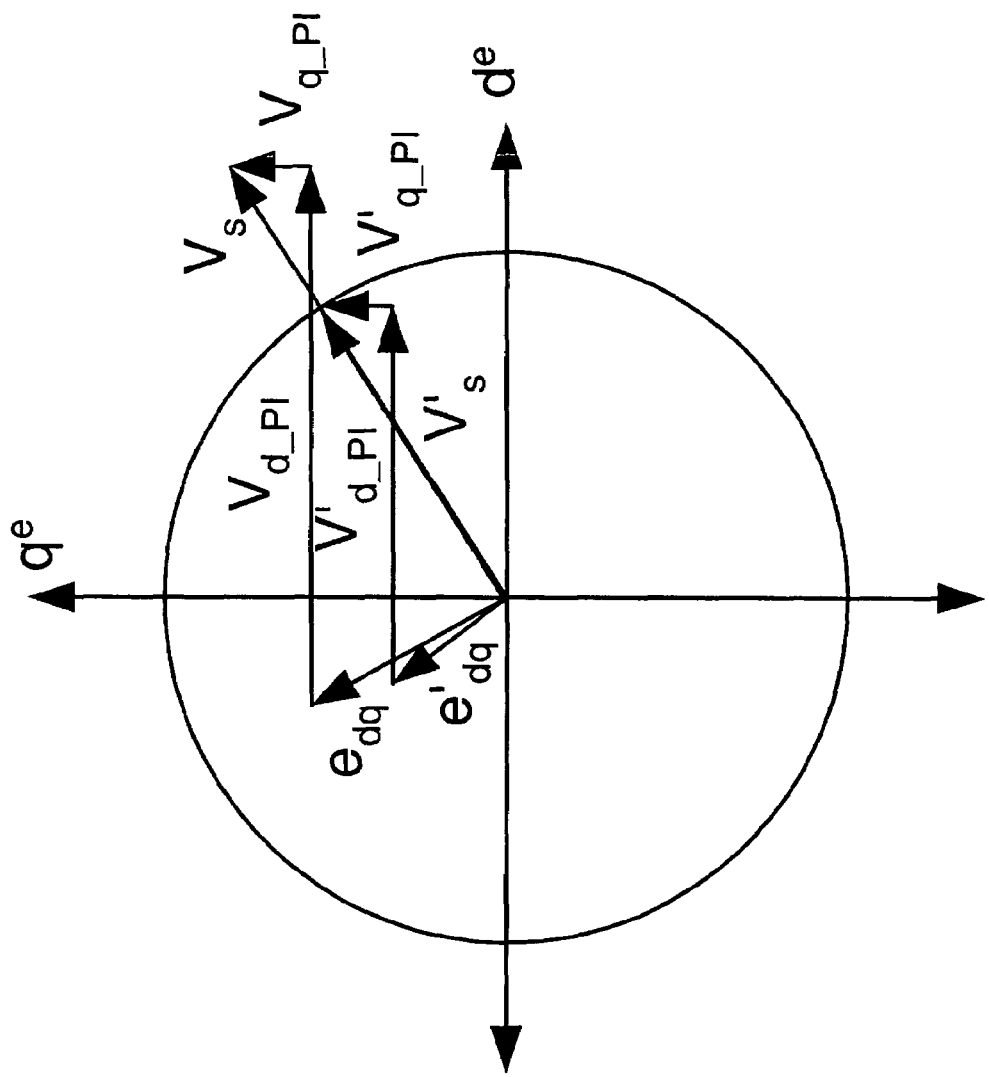
FIG. 1 is a vector diagram of an IPM motor under dynamic conditions in a field weakening region.

The following description of the preferred embodiment(s) is merely exemplary in nature and is in no way intended to limit the invention, its application, or uses. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality. For purposes of clarity, the same reference numbers will be used in the drawing to identify similar elements.

The Interior Permanent Magnet (IPM) motor drive excited by a PWM current regulated inverter yields attractive performance characteristics including accurate torque control, fast dynamic response, and high drive efficiency. Additionally, IPM drives provide extended constant power characteristic using a flux weakening approach. Flux weakening in the IPM motor drive requires special control action to carry out flux weakening (also known as "field weakening") by appropriately adjusting the stator excitation.

During a constant torque region, the closed loop current regulators control the applied PWM voltage excitation so that the instantaneous phase currents follow their commanded values. However, saturation of the current regulators occurs at higher speeds when the motor terminal voltage increases sufficiently to approach the maximum voltage that the PWM inverter can apply. Beyond this limit, the flux should be weakened to maintain proper current regulation up to maximum motor speed.

The voltage equation for the IPM motor in the synchronous rotating reference frame can be represented in the matrix form as follows:

$$\begin{bmatrix} V_{ds}^e \\ V_{qs}^e \end{bmatrix} = \begin{bmatrix} R_s + L_d p & -\omega_e L_{qs} \\ \omega_e L_{ds} & R_s + L_q p \end{bmatrix} \begin{bmatrix} i_{ds}^e \\ i_{qs}^e \end{bmatrix} + \begin{bmatrix} 0 \\ \omega_e \phi_f \end{bmatrix} \quad (1)$$

Where, $V_{ds}^e$ and $V_{qs}^e$ are d-axis and q-axis motor terminal voltages in the synchronous reference frame, $i_{ds}^{-e}$ and $i_{qs}^{-e}$ are the d-axis and q-axis motor terminal currents in synchronous reference frame, $L_d$ and $L_q$ are the d-axis and q-axis stator self-inductances, $R_s$ is stator resistance, $\phi_f$ is permanent magnet flux linkage, $\omega_e$ is electrical angular velocity, and p is derivative operator. For a high efficiency machine operating at high speed in the field weakening region, the resistive voltage drop term due to $R_s$ can typically be ignored.

The developed torque equation of the IPM motor is expressed as follows:

$$T_e = \frac{3P}{4}[\phi_f i_{qs}^e + (L_d - L_q) i_{qs}^e i_{ds}^e] \quad (2)$$

Where P is number poles. DC link voltage and PWM controls limit the maximum voltage $V_{smax}$. The inverter current rating and the machine thermal rating determine the maximum current $I_{smax}$. Therefore the voltage and the current of the motor have following limits:

$$V_{ds}^{e2} + V_{qs}^{e2} \leq V_{smax}^2 \quad (3)$$

$$i_{ds}^{-e2} + i_{qs}^{-e2} \leq I_{smax}^2 \quad (4)$$

The total stator voltage vector will consist of both steady state voltage terms and transient voltages. The total stator voltage magnitude is expressed as follows in eq. (5):

$$V_s^{e2} = \left[L_d \frac{di_d}{dt} - \lambda_q \omega_e\right]^2 + \left[L_q \frac{di_q}{dt} + \lambda_d \omega_e\right]^2 \quad (5)$$

$$V_s^{e2} = [(\lambda_d \omega_e)^2 + (\lambda_q \omega_e)^2] + \left[\left(L_d \frac{di_d}{dt}\right)^2 - 2\lambda_q \omega_e L_d \frac{di_d}{dt} + \left(L_q \frac{di_q}{dt}\right)^2 + 2\lambda_d \omega_e L_q \frac{di_q}{dt}\right] \quad (6)$$

The first term in equation (6) is the steady state stator voltage and the second term is the transient stator voltage. The second term includes a square of a d-axis current transient minus a d-axis cross coupling term plus a square of the q-axis transient plus a q-axis cross coupling term. In steady state operation, the second term in equation (6) is generally ignored. However, at high fundamental frequency these terms become very important when 100% stator current transients are commanded. Considering transients, the voltage limit equation (3) can be rewritten as, $$V_{ds}^{e2} + V_{qs}^{e2} \leq V_{ref}^2 \quad (7)$$

where, $$V_{ref}^2 = V_{smax}^2 - \left(\left(L_d \frac{di_d}{dt}\right)^2 - 2\lambda_q \omega_e L_d \frac{di_d}{dt} + \left(L_q \frac{di_q}{dt}\right)^2 + 2\lambda_d \omega_e L_q \frac{di_q}{dt}\right) \quad (8)$$

The field-weakening control system according to the present invention works under the limits outlined in equations (4) and (7). Once the DC bus voltage limit is reached, there is no longer sufficient voltage headroom to accommodate stator current dynamics. When a fast stator current transient is requested, even with high bandwidth current regulators, the current regulation will not be maintained due to shortage of available voltage to produce the requested current. Under this condition, reducing the flux command below the normal steady state value will increase voltage headroom to provide proper current regulation. The reduction in flux is only required during stator current transients. Once the steady state current is reached, the optimum steady state flux level can be reestablished to provide requested torque. In practice, limiting $V_{ref}$ as shown in eq. (8) indirectly reduces the flux command.

Referring now to FIG. 1, the dynamic behavior of an IPM machine using the proposed flux weakening control system is shown. The commanded stator voltage $V_s$, is composed of back-EMF voltage $e_{dq}$ and the dynamic voltage (i.e. transient voltage) $V_{dq\_PI}$ required to minimize the current error.

Following the stator current transient, the commanded stator voltage $V_s$ is outside the linear unit circle range. Thus, the actual command voltage vector can not be achieved, and will be rescaled to the unit circle. This results in reduction of $V_{d\_PI}$ relative to the value calculated by the d-axis current regulator. Thus by not applying the originally calculated $V_{d\_PI}$ voltage, the d-axis current regulator will lose current regulation. To avoid this scenario, the proposed algorithm reduces both d and q-axes back EMF ($e'_{dq}$) by reducing the flux command during transient duration such that the resultant stator voltage vector ($V'_s$) will be inside the unit circle limit. This provides a sufficient voltage margin to regulate both d and q-axes current regulators.

The modification of the maximum available voltage limit as described in eq. (8) and above, has included the influence of the transient voltages. However, at high speeds, fast torque or stator current transients also imply fast transients on the power flow on the DC bus. The finite impedance of the source coupled with the change in the DC current result in the DC bus voltage fluctuation. In the case of regenerating mode, the DC bus voltage will increase which provides additional voltage margin for the current regulators. However, in the case of the motoring, the DC bus will sag resulting in loss of voltage. This loss of DC bus voltage will further reduce the voltage margin to control the currents.

The measured DC bus voltage is employed in a feed back manner when calculating $V_{smax}$ in equation (8). However, the effect of the DC bus sag will not be utilized until it has been detected. To avoid this and improve dynamic performance, a feed forward solution is preferably adopted. By computing the rate of change of the torque command, the change in the DC bus voltage can be estimated. With this knowledge, the flux command can be modified in feed forward manner such that the commanded voltage will also be reduced. This can be expressed as eq.(9).

$$\Delta \psi_{ff} = G \frac{dT^*}{dt} \qquad (9)$$

The gain "G" in eq. (9) is experimentally determined. The torque command signal is noise free and of limited slew rate. Hence, taking numerical derivative will not induce unwanted high frequency noise. While the stable current regulation control system will be described in conjunction with IPM machines, skilled artisans will appreciate that surface mount magnet machines and synchronous reluctance type machines may also be used.

Figure 2:
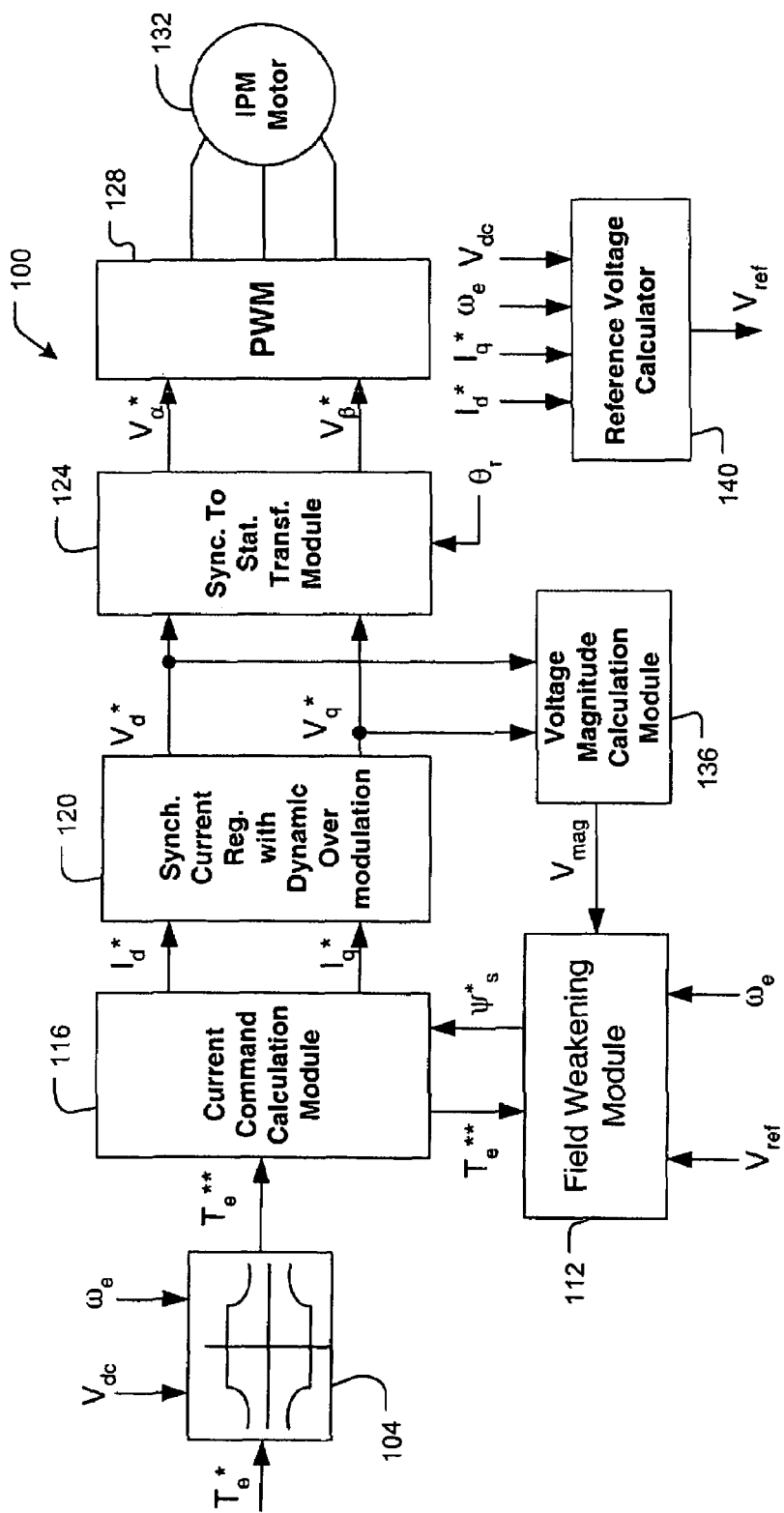
FIG. 2 is a functional block diagram of a control system for vector controlled IPM motor drives.

Referring now to FIG. 2, a motor control system 100 is shown. The input to the motor control system 100 is a torque command ($T_e^*$) which is processed by the torque limiter module 104. The torque limiter module 104 limits the torque command depending on available DC link voltage $V_{dc}$ and rotor angular velocity $\omega_r$. The output of the torque limiter module 104 is modified torque command ($T_e^{**}$).

The modified torque command ($T_e^*$) and a calculated stator flux command ($\psi^*_s$) generated by a field-weakening module 112 are used as inputs to a D and Q-axis current command calculation module 116. Additional details of the field-weakening module can be found in U.S. patent Ser. No. 10/939553, filed on Sep. 13, 2004, which is hereby incorporated by reference in its entirety.

The current commands $I_d^*$ and $I_q^*$ are then output to a synchronous current regulator module with dynamic over modulation 120, which generates command voltages $V_d^*$ and $V_q^*$. Command voltages $V_d^*$ and $V_q^*$ are vector rotated, using rotor angular position ($\theta_r$) either from an absolute position sensor or estimated using sensorless techniques, using synchronous to stationary transformation module 124. Stationary output voltages $V_\alpha^*$ and $V_\beta^*$ from (4) are fed to PWM inverter 128, which applies alternating three phase voltages to the stator windings of an Interior Permanent Magnet (IPM) machine 132.

Synchronous reference frame voltage commands $V_d^*$ and $V_q^*$ are supplied to voltage magnitude calculation ($V_{mag}$) module 136 where $V_{mag} = \sqrt{(V_d^*)^2 + (V_q^*)^2}$. The output of module 136, a reference voltage ($V_{ref}$) from a reference voltage calculation module 140, and angular velocity ($\omega_e$) are supplied to the field-weakening module 112, which generates the stator flux command $\Psi_s^*$.

Figure 3:
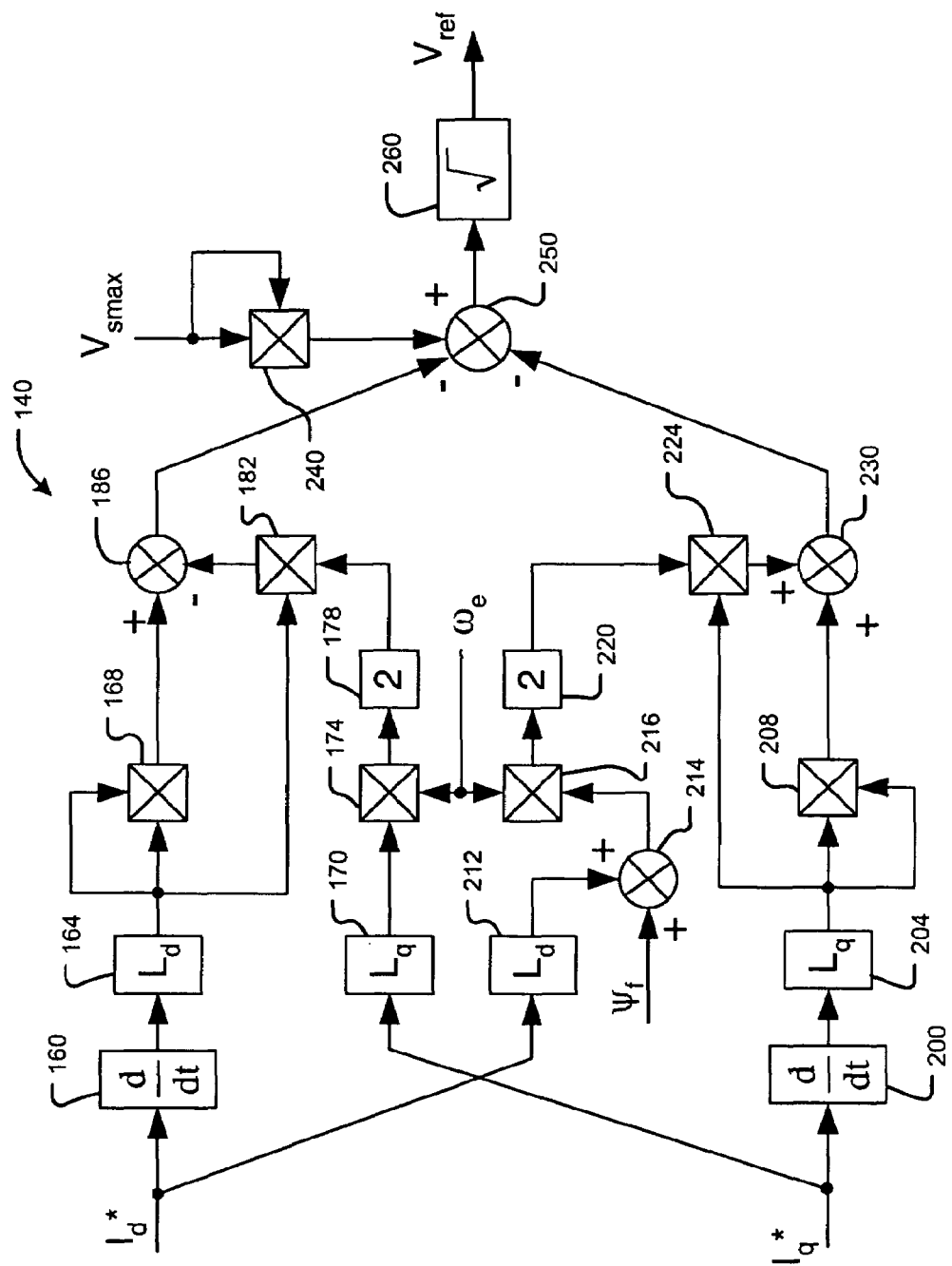
FIG. 3 is a functional block diagram of a module for calculating the reference voltage.

Referring now to FIG. 3, the reference voltage calculation module is shown in further detail. The commanded d axis current is processed through a derivative operator 160 and multiplied by d axis inductance in a multiplier 164. The output of the multiplier 164 is then squared using multiplier 168. A cross coupling transient voltage term is calculated by processing q-axis current command through multiplier 170 ($L_q$ factor) multiplier 174 (multiply by $\omega_e$) and multiplier 178 (2 factor). Multiplier 182 computes the product of the outputs of multipliers 178 and 164. The output of the multiplier 182 is then subtracted from the output of the multiplier 168 using summer 186.

Similarly, the commanded q axis current is processed through derivative operator 200 and multiplied by q axis inductance in multiplier 204. The output of multiplier 204 is then squared using multiplier 208. A cross coupling transient voltage term is calculated by processing d-axis current command through multiplier 212, summed with $\phi_f$ by summer 214, and further processed through multipliers 216, and 220. Multiplier 224 computes the product of the outputs of 204 and 220. The output of the multiplier 224 is then added to the output of the block 208 using summer 230.

The predefined maximum stator voltage $V_{smax}$ is squared using multiplier 240. The output of summers 186 and 230 are subtracted from the output of the multiplier 240 in a summer 250. The output of the summer 250 is then processed through a square root block 260 to calculate the reference voltage $V_{ref}$.

The machine control system was implemented using a 70 kW IPM machine. Experimental results obtained using a conventional control system are shown in FIG. 4 and using the machine control system according to the present invention are shown in FIG. 5.

Figure 4:
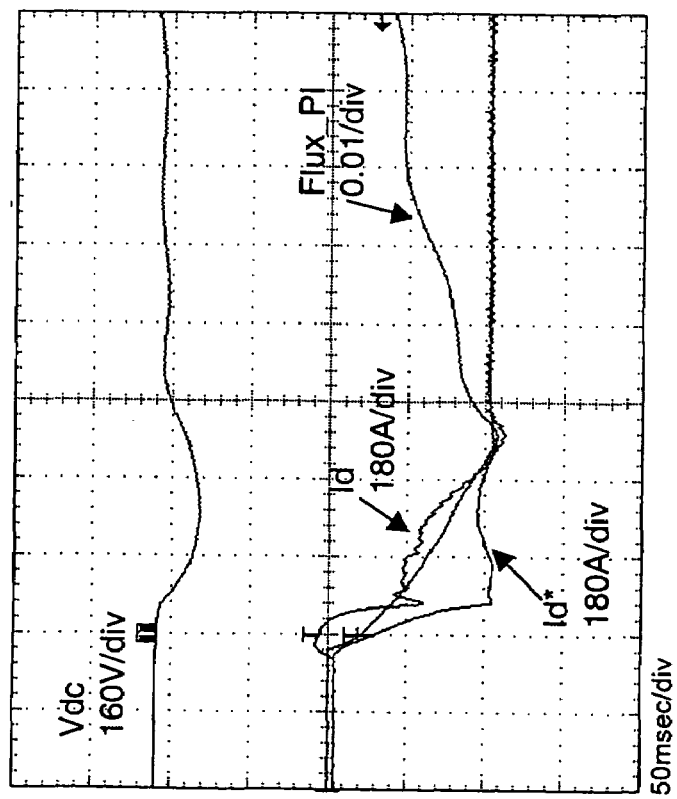
FIG. 4 illustrates current regulation performance during a torque transient at constant motor speed without dynamic voltage compensation.

In FIG. 4, following the torque transient, the commanded d-axis current goes from 0 to −360 Amps within about 25 msec. However, the measured d-axis current was not tracking the commanded value for at least 150 msec following the transient. As can be seen in FIG. 4, the DC bus voltage sags following the transient causing a reduction in available voltage margin for d-axis current regulation. This highlights the poor performance of the conventional approach following the torque transient.

Figure 5:
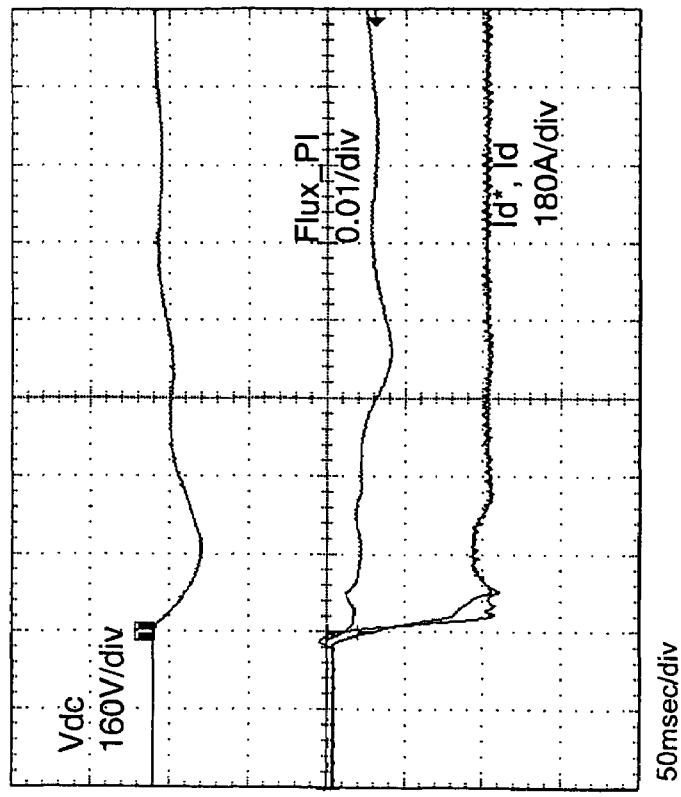
FIG. 5 illustrates current regulation performance during a torque transient at constant motor speed with dynamic voltage compensation according to the present invention.

Referring now to FIG. 5, the performance with the machine control system is shown according to the present invention following the same torque transient applied in FIG. 4. In this case, the d-axis current is well regulated and tracking the commanded value. The performance is good even with the fluctuation in DC bus voltage.

The machine control system according to the present invention provides good current regulation in the field weakening range under fast transients, maintains torque linearity while field weakening, is insensitive to variations in DC link voltage, requires less look-up table memory, and works for both low and high back EMF type machines.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for an electric machine, comprising:
   a first calculation module that receives a modified torque command and a calculated stator flux command and that generates first and second current commands and first and second voltage commands;

a voltage magnitude calculation module that generates a voltage magnitude based said first and second voltage commands;

a reference voltage calculator module that generates a reference voltage based on a DC link voltage, an angular stator velocity and said first and second current commands; and a flux weakening module that generates said calculated flux command based on said angular stator velocity, said reference voltage and said voltage magnitude.

2. The control system of claim 1 further comprising a torque limiting module that generates said modified torque command by limiting an input torque command.

3. The control system of claim 1 wherein said first calculation module includes a current command calculation module that generates said first and second current commands based on said calculated stator flux command and said modified torque command.

4. The control system of claim 3 further comprising a synchronous current regulator module that generates said first and second command voltages based on said first and second command currents.

5. The control system of claim 1 further comprising a transformation module that generates first and second stationary output voltages from said first and second command voltages.

6. The control system of claim 1 wherein a square of said reference voltage is equal to a square of said voltage magnitude minus a square of a transient stator voltage.

7. The control system of claim 6 wherein said square of said transient stator voltage is equal to a first current transient minus a first cross coupling term plus a square of second current transient minus a second cross coupling term.

8. A method for operating an electric machine, comprising:

calculating first and second current commands based on a modified torque command and a calculated stator flux command;

generating first and second voltage commands based on said first and second current commands;

calculating a voltage magnitude based said first and second voltage commands;

generating a reference voltage based on a DC link voltage, an angular stator velocity and said first and second current commands; and generating said calculated flux command based on said angular stator velocity, said reference voltage and said voltage magnitude.

9. The method of claim 8 further comprising limiting an input torque command to said modified torque command.

10. The method of claim 8 further comprising transforming said first and second command voltages into first and second stationary output voltages.

11. The method of claim 8 wherein a square of said reference voltage is equal to a square of said voltage magnitude minus a square of a transient stator voltage.

12. The method of claim 11 wherein said square of said transient stator voltage is equal to a first current transient minus a first cross coupling term plus a square of second current transient minus a second cross coupling term.

* * * * *